United States Patent [19]

Benrabah et al.

[11] Patent Number: 5,696,224
[45] Date of Patent: Dec. 9, 1997

[54] IONICALLY CONDUCTIVE MACROMELECULAR MATERIALS AND THEIR USE IN ELECTROCHEMICAL SYSTEMS

[75] Inventors: Djamila Benrabah, Grenoble; Michel Armand, Saint-Martin-D'Uriage; Didier Delabouglise, Grenoble, all of France

[73] Assignees: Centre National de la Recherche Scientifique, Paris, France; Hydro-Quebec, Montreal, Canada

[21] Appl. No.: 508,529

[22] Filed: Jul. 28, 1995

[30] Foreign Application Priority Data

Jul. 28, 1994 [FR] France ............... 94 09347

[51] Int. Cl.$^6$ ............... C08F 6/00; C07C 315/00
[52] U.S. Cl. ............... 528/491; 568/35
[58] Field of Search ............... 568/35, 461, 464

[56] References Cited

U.S. PATENT DOCUMENTS

| | | |
|---|---|---|
| 3,758,591 | 9/1973 | Koshar . |
| 3,758,593 | 9/1973 | Koshar . |
| 4,818,644 | 4/1989 | Armand . |
| 5,021,308 | 6/1991 | Armand et al. ............ 429/194 |
| 5,072,040 | 12/1991 | Armand ............ 564/82 |
| 5,136,097 | 8/1992 | Armand ............ 568/28 |
| 5,162,177 | 11/1992 | Armand et al. ............ 429/194 |
| 5,194,253 | 3/1993 | Garrido ............ 424/78.03 |
| 5,260,145 | 11/1993 | Armand et al. ............ 429/50 |
| 5,350,646 | 9/1994 | Armand et al. ............ 429/192 |
| 5,393,847 | 2/1995 | Alloin et al. ............ 525/403 |
| 5,414,117 | 5/1995 | Armand et al. ............ 562/828 |
| 5,459,228 | 10/1995 | Armand et al. ............ 528/373 |

FOREIGN PATENT DOCUMENTS

| | | |
|---|---|---|
| 0 267107 | 5/1988 | European Pat. Off. . |
| 0 603 370 | 10/1994 | European Pat. Off. . |
| 2 687671 | 8/1993 | France . |
| WO 93/09092 | 5/1993 | WIPO . |
| WO 93/16108 | 8/1993 | WIPO . |

*Primary Examiner*—Porfirio Nazario-Gonzalez
*Assistant Examiner*—Karl J. Puttlitz, Jr.
*Attorney, Agent, or Firm*—Oblon, Spivak, McClelland, Maier & Neustadt, P.C.

[57] ABSTRACT

A macromolecular material having a linear, branched or crosslinked framework, and substituted with ionic substituents, wherein the ionic substituents are incorporated by reaction of a group, Y, of one or more ionic monomers having the formula (I):

$$M[Y-(O-(CHR)_p-(CH_2)_q)_n-C(SO_2R_F)_2]_m \quad (I)$$

wherein

M, m, $R_F$, R, Y, n, p and q are as described herein;

and the use of the macromolecular material in the production of a variety of electrochemical systems.

16 Claims, No Drawings

IONICALLY CONDUCTIVE MACROMELECULAR MATERIALS AND THEIR USE IN ELECTROCHEMICAL SYSTEMS

BACKGROUND OF THE INVENTION

1. Field of the Invention

The present invention relates to a macromolecular material which is ionically conductive and is useful in the production of electrochemical systems.

2. Discussion of the Background

Electrochemical storage systems, especially batteries, supercapacitors or electrochromic systems for light modulation, function with increased elementary voltages and consequently require aprotic electrolytes having a broadened area of stability. Among these aprotic electrolytes, there are electrolytes which are obtained by dissolving an easily dissociated salt in a solvent which includes an aprotic polar liquid and/or a solvating polymer. Increased ionic conductivities are obtained with salts having an anion with its charge dislocated on an atom of nitrogen or of carbon such as those described, in EP-A-0,290,511 (corresponding to U.S. Pat. No. 5,194,253) in EP-A-0,267,107, or in EP-A-0,567,637.

Moreover, electrolytes are known which are made of a material having a macromolecular framework with solvating properties and which carries substituents which include ionic groups. By way of example, one can cite solvating copolymers which carry substituents of formula —[CFX—$SO_2$—$C(SO_2R_F)_2$]⁻$M^+$ in which X represents hydrogen or fluorine, $R_F$ represents a perfluoroalkyl radical and $M^+$ represents a metal or organic cation, as described in EP-A-0,603,370. Also known are copolymers which are obtained by copolymerization of a compound [$(R_FSO_2)_2CY$]⁻$M^+$ in which $R_F$ represents a perfluoroalkyl radical, $M^+$ represents a metal or organic cation and Y represents an electron-attracting group —CN, RCO—, RPO< or $RSO^2$—, where R is an organic radical having a polymerizable functional group, as described in EP-A-0,567,637. In these ionically conductive macromolecular materials, the ionic group is attached to the macromolecular framework by a radical which includes an electron-attracting functional group directly bonded to the anionic carbon which also carries two electron-attracting substituents $R_FSO_2$. However, the preparation of these materials is complex. Moreover, the materials in which the electron-attracting functional group directly attached to the anionic carbon is a carbonyl group are particularly sensitive to hydrolysis.

SUMMARY OF THE INVENTION

Accordingly, one object of the present invention is to provide a macromolecular material that has ionic groups.

Another object of the present invention is to provide an ionically conductive material made of a macromolecular material having ionic groups.

Another object of the present invention is to provide a method for using the ionically conductive material of the present invention as an electrolyte in an electrochemical device or as a binder of a composite electrode.

These and other objects of the present invention have been satisfied by the discovery of a macromolecular material which is ionically conductive in which the ionic groups are attached to the macromolecular framework by a radical which, although not having an electron-attracting group directly connected to carbon, nevertheless has excellent properties of ionic conduction, offers an area of sufficient stability for electrochemical applications and can be prepared with a good yield, beginning with compounds of the bis(perfluoroalkylsulfonyl)methane type.

DETAILED DESCRIPTION OF THE PREFERRED EMBODIMENTS

The present invention relates to a macromolecular material having a linear, branched or comb type framework, optionally crosslinked, which has ionic substituents. The ionic substituents of the present invention are derived by reaction of the Y group of ionic monomers which have the formula (I):

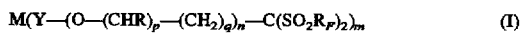

$$M(Y-(O-(CHR)_p-(CH_2)_q)_n-C(SO_2R_F)_2)_m \qquad (I)$$

in which

M represents a proton, a metal alkaline cation, a cation of an alkaline-earth metal, a cation of a transition metal, a cation of a rare earth metal, an ammonium cation, an organic cation selected from the group consisting of cations of amidine, guanidine, pyridine, phosphonium, sulfonium, and ammonium which have at least one substituent, or oxonium;

m represents the valence of the cation M;

$R_F$ is linear or branched $C_1$–$C_8$ perfluoroalkyl, preferably a $C_1$–$C_4$ perfluoroalkyl;

R represents hydrogen or $C_1$–$C_4$ alkyl;

Y represents allyl, glycidyl, vinylbenzyl, acryloyl, methacryloyl or hydrogen;

$0 \leq n \leq 40$, preferably $0 \leq n \leq 10$;

$1 \leq p+q \leq 4$;

with the proviso that if n=0, Y represents allyl, glycidyl or vinybenzyl.

M is preferably $Li^+$ in the macromolecular materials in accordance with the present invention.

The perfluoroalkyl radical, $R_F$, is preferably chosen from among perfluoromethyl, perfluoroethyl, perfluoropropyl, isoperfluoropropyl, and perfluorobutyl.

In one embodiment of the present invention, the macromolecular material includes at least one segment that consists essentially of solvating units, such as units of ether, amine or of sulfur, and preferably have an ionic substituent —[Y'—(O—(CHR)$_p$—(CH$_2$)$_q$)$_n$—C(SO$_2$R$_F$)$_2$]⁻ connected to the macromolecular framework by the Y' radical derived from the Y radical of the ionic monomer (I). In the context of the present invention, the term "segment" signifies a portion of the macromolecular chain comprised of several identical monomer units or different units, as well as a portion consisting of a single monomer unit. The term "ionic substituent" designates a substituent —[Y'—(O—(CHR)$_p$—(CH$_2$)$_q$)$_n$—C(SO$_2$R$_F$)$_2$]⁻ in which Y', R, $R_F$, p, q, and n have the meaning given previously. The macromolecular materials which include solvating segments comprised of oxyalkylene units, among which some carry an ionic substituent, are particularly preferred. The oxyalkylene units can additionally carry other substituents such as $C_1$–$C_{10}$ alkyl substituents, or $C_1$–$C_{10}$ oxyalkylene or $C_1$–$C_{10}$ polyoxyalkylene substituents.

Preferably the solvating segment is a homopolymer of ethylene oxide or a random, or mostly random, copolymer consisting essentially of ethylene oxide units among which at least some carry an ionic substituent. Among the copolymers, those which include at least 70% of the total number of monomer units being ethylene oxide units are particularly preferred. Co-monomers for use in the copolymers are selected from monomers which preserve the solvating character of the segment. Suitable co-monomers include propylene oxide, oxymethylene, oxetane, tetrahydrofuran, dioxolane and glycidyl alkylethers. The solvating segment preferably has a mass of between 150 and 20,000, most preferably between 150 and 10,000. The solvating segments are connected to one another and possibly to other segments by formation of —C—C— or —C—O— bonds, so as to form macromolecules having a linear or branched, optionally crosslinked, form.

In another embodiment of the present invention, the macromolecular material includes at least one segment comprised of non-solvating units among which at least some carry an ionic substituent. The non-solvating segment can be selected from among polyenes, polyesters, polyamides, polynitriles and polyvinylethers.

In macromolecular materials according to the present invention, a segment such as defined above can be connected to other segments of the same kind, or to segments of a different kind. The bonding group can be a divalent group, resulting in a macromolecular material that is essentially linear. The bonding group can also be a tetravalent or trivalent bonding group, resulting in a macromolecular material that is branched, and possibly crosslinked. The macromolecular material according to the present invention can include segments with a solvating nature that have ionic substituents, segments with solvating character that do not carry ionic substituents, non-solvating segments that carry ionic substituents, non-solvating segments that do not carry ionic substituents, or mixtures thereof.

The macromolecular material of the present invention can be obtained by various processes.

One process for preparing the macromolecular materials of the present invention comprises carrying out a reaction of co-crosslinking between a macromolecular material substituted by radicals having carbon-carbon double bonds and at least one ionic monomer (I) in accordance with the present invention in which Y represents allyl, glycidyl, acryloyl or methacryloyl. This process is particularly useful for the preparation of a macromolecular material according to the present invention which contains a polyether framework. Among the polyethers substituted by radicals having carbon-carbon double bonds, the copolymers of at least one cyclic ether which is unsubstituted or substituted by alkyl or poly(alkyloxy), and of at least one cyclic ether substituted by an unsaturated radical having a carbon-carbon double bond are preferred. Such copolymers can be obtained by means of cationic polymerization, anionic polymerization or by a Vandenberg polymerization. Suitable cyclic ethers that are non-substituted or which carry a saturated substituent, include ethylene oxide, propylene oxide, epoxybutane, dioxolane and tetrahydrofuran. Suitable ethers having an unsaturated substituent include epoxyalkenes, such as 1,2-epoxy-5-hexene, 1,2-epoxy-7-octene, allylglycidylether and furfurylglycidylether, and oxiranes having an acryloxyalkylene or methacryloxyalkylene substituent, an allyl oxyalkylene substituent, or an allyl substituent. Among the ionic monomers (I) which are particularly suited for the reaction of co-crosslinking with a polyether, the lithium salt of 4,4 bis(trifluoromethylsulfonyl)-1 butene, and the lithium salt of the acrylate of 3,3-bis(trifluoromethyl-sulfonyl)-1-propyl are preferred.

Another process for preparing the macromolecular materials of the present invention of the polyether type comprises carrying out co-polymerization between at least one monomer having an ether function or at least one ionic monomer (I) in which Y represents glycidyl, acryloyl or methacryloyl. Among the saturated monomers having an ether function, ethylene oxide, propylene oxide, epoxybutane, dioxolane and tetrahydrofuran are preferred. Among the ethers having an unsaturated substituent epoxyalkenes, such as 1,2-epoxy-5-hexene, 1,2-epoxy-7-octene, allylglycidylether, and furfurylglycidylether, and oxiranes having an acryloxyalkylene or methacryloxyalkylene substituent, an allyloxyalkylene substituent or an allyl substituent are preferred. Among the ionic monomers (I) which are particularly suited for co-polymerization with an ether monomer, the lithium salt of the acrylate of 3,3-bis(trifluoromethyl-sulfonyl)-1-propyl is most preferred.

A third process for preparing the macromolecular materials of the present invention comprises polycondensing at least one ionic monomer (I) in which Y represents hydrogen and at least one monomer having functional groups that do not react directly with the OY═OH group of the ionic monomer, but do react with the OH group of the ionic monomer through reaction with a coupling agent which has at least two groups capable of reacting with the —OH groups. The average functionality of the reacting entities must be at least equal to 2. Such a polycondensation is carried out in the presence of a strong base such as KOH.

The macromolecular material of the present invention can be prepared in a similar manner by a process which comprises polycondensing at least one ionic monomer (I) in which Y represents hydrogen and a pre-polymer having functional groups that do not react directly with the OY═OH group of the ionic monomer, but do react with the OH group of the ionic monomer through reaction with a coupling agent which has at least two groups capable of reacting with the OH groups. The average functionality of the reacting entities must be at least equal to 2.

Suitable coupling agents include chlorinated derivatives of alkenes, such as cis 2-butene, trans 2-butene, methyl 2-propene, cis 2,4-hexadiene, and preferably 3-chloro-2-chloromethyl-1-propene.

A preferred ionic monomer (I) that can be used in this third type of process is the lithium salt of 4,4-bis (trifluoromethyl-sulfonyl)-1-butanol.

The process of polycondensation is particularly appropriate for obtaining macromolecular materials according to the present invention which include polyether segments. In such a process, the monomer which reacts with the OH group of the ionic monomer, by way of a coupling agent, has at least one ether function. A suitable monomer having at least one ether function is glycerol. The prepolymer that reacts with the OH group of the ionic monomer through reaction with a coupling agent has, moreover, ether functions and is preferably selected from among the polyalkylene glycols or the polyalkylene polyols. The polyethylene glycols and the polyethylene triols are particularly preferred.

The macromolecular material of the present invention can be used in producing an ionically conductive material.

An ionically conductive material in accordance with the present invention can contain, in addition to the macromolecular material obtained from ionic monomers (I), a polar aprotic compound.

When the macromolecular material has intrinsic solvating properties, it can be used by itself as an ionically conductive material. It can also contain from 2% to 98% of a polar aprotic compound which is liquid at the temperatures of use. At lower levels of aprotic polar compound, the resulting material is plastified, whereas at higher levels of aprotic polar compound, the resulting material is gelled.

When the macromolecular material of the present invention does not have intrinsic solvating properties, it can be used for the preparation of an ionically conductive material by adding to it at least 5% by volume of an aprotic polar compound.

Suitable aprotic polar compounds include linear or cyclic carbonates, linear or cyclic ethers, linear or cyclic esters, linear or cyclic sulfones, sulfamides and nitriles.

For the production of a conductive material, it is also possible to mix a macromolecular material of the present invention which does not have sufficient solvating properties with a macromolecular material which has a strongly solvating character, such as a polyether.

The ionically conductive material of the present invention has an ionic conduction which is largely ensured by the $M^{m+}$ ions of the ionic substituent. In certain cases it can be advantageous to add to it a salt of a cation M' and an anion selected from among $ClO_4^-$, $AsF_6^-$, $PF_6^-$, $BF_4^-$, $R_FSO_3^-$, $CH_3SO_3^-$, $N(R_FSO_2)_2^-$, $C(R_FSO_2)_3^-$ and $CF(R_FSO_2)_2^-$, with $R_F$ representing a $C_1$-$C_8$ perfluoroalkyl group or fluorine. The cation M' is preferably selected from a proton, an alkali metal cation, an alkaline-earth metal cation, a transition metal cation, a rare earth metal cation, an ammonium cation, an organic cation selected from cations of amidine, guanidine, pyridine, phosphonium, sulfonium, and ammonium which have at least one substituent and oxonium. M' can be identical to M or different from M within the same material.

The ionically conductive material according to the present invention can be used advantageously in a lithium rechargeable battery whose operation is ensured by reversible circulation of lithium ions in an electrolyte between a positive electrode and a negative electrode. The ionically conductive material of the present invention can be used as an electrolyte. It can also be used as a binder in a composite electrode in either a positive electrode or a negative electrode.

A negative composite electrode can be prepared by adding a material that is capable of reversibly intercalating lithium ions at low redox potential, into a solution of the ionically conductive material according to the present invention in an aprotic polar solvent. The resulting mixture is then spread out on a strip of metal or metallized plastic used as a collector, and the solvent evaporated with heat under a nitrogen atmosphere. Preferred materials capable of reversibly intercalating lithium ions at low redox potential, include the natural or synthetic carbon-based materials such as petroleum coke, graphite, graphite whiskers, carbon fibers, mesocarbons having micrograins, coke of pitch, a coke having needle morphology; the oxides of formula $Li_xMoO_2$ or $Li_xWO_2$ in which $0 \leq x \leq 1$, $Li_xFe_2O_3$ with $0 \leq x \leq 8$, $Li_{4+x}Ti_5O_{12}$ with $0 \leq x \leq 5$, the sulfides of formula $Li_{9+x}Mo_9O_6$ with $0 \leq x \leq 4$, and $Li_xTiS_2$ with $0 \leq x \leq 2$ and the oxysulfides.

A composite positive electrode includes a compound which confers electronic conductivity, an active material and an ionically conductive material of the present invention as a binder. The compound which confers electronic conductivity can be selected from carbons in the form of powder or fibers, powders of barely oxidizable metals, their nitrides or their carbides. The active material can be selected from metal oxides, especially the oxides of transition metals (for example, Ti, V, Mn, Cr, Fe, Co or Ni), alone or in a mixture, or compounds such as lithium oxide. A composite electrode can be prepared by mixing the active material and the compound which confers electronic conductivity in a solution of the binder in an appropriate solvent, spreading the mixture obtained on a strip of metal or metallized plastic used as the collector, then evaporating the solvent with heat under a nitrogen atmosphere.

The ionically conductive material of the present invention can additionally be used as an electrolyte in a supercapacitor, and/or as a binder of a composite positive electrode and/or a composite negative electrode.

Moreover, the ionically conductive material of the present invention can be used as an electrolyte in electrochromic systems for light modulation.

Having generally described this invention, a further understanding can be obtained by reference to certain specific examples which are provided herein for purposes of illustration only and are not intended to be limiting unless otherwise specified.

EXAMPLES

EXAMPLE 1

4,4 bis(trifluoromethylsulfonyl)-1 butene was prepared and purified according to Example 2 of U.S. Pat. No. 3,758,593, by reaction of methylmagnesium chloride on bis(perfluoro-sulfonyl) methane in solution in THF. The corresponding lithium salt was obtained by reaction with an excess amount of lithium carbonate in water, evaporation and extraction of the salt $Li[CH_2=CH-CH_2C(SO_2R_F)_2]$ in acetone.

A polymer electrolyte with cationic unitary transport was prepared from 4 g of a copolymer of ethylene oxide (95 molar percent) and allylglycidyl-ether (5%) having a molecular weight Mw=230,000, and 530 mg of the previously obtained salt. The two ingredients were placed in solution in 20 ml of acetonitrile, and 70 mg of benzoyl peroxide were added. The solution was spread by means of a template in order to obtain a 40 μm film after evaporation. By heating to 80° C. under an atmosphere of argon, the film was crosslinked and gave good mechanical performance.

EXAMPLE 2

An electrochemical generator was prepared by the stacking up of a strip of metallic lithium in 20 μm thickness, a film of electrolyte prepared according to Example 1 and a composite electrode 80 μm thick made of 40% vanadium oxide $V_2O_5$, 7% acetylene black, 45% of a mixture of a copolymer of ethylene oxide and allylglycidyl-ether as used in Example 1, 8% of the lithium salt of Example 1 and 1% of benzoyl peroxide, all percentages being expressed by volume. The crosslinking of the composite electrode was ensured by thermal dissociation of the initiator at 80° C. Two films of metallized polypropylene of 8 μm thickness located on both sides of the stack were used as current collectors. The generator was rechargeable and had an average voltage of 2.8 V with current density of 200 μA at 40° C.

EXAMPLE 3

4,4 bis(trifluoromethylsulfonyl)-1-butanol was prepared by stoichiometric addition of oxetane to $(MgCl)_2C(SO_2R_F)_2$ in solution in THF, followed by acidification of the medium and ether extraction. The product was purified by distillation and the potassium salt was prepared, in the same manner as in Example 1, by reaction with excess potassium carbonate and extraction of the dry residue in acetone.

4.3 g of this compound, 25 g of a polyoxide of ethylene triol obtained from glycerol and having a mass M=2000, (commercially available from DKS Company (Osaka, Japan)), 3.5 g of powdered potassium hydroxide and 3.12 g of 3-chloro-2-chloromethyl-1-propene were introduced into a mechanically stirred reaction vessel. The mixture was brought to 40° C. and 20 ml of THF were added after 2 hours. Polycondensation was terminated after 30 hours and the reaction mixture diluted in 75 ml of THF and centrifuged to eliminate the KCl which was formed and excess KOH. The polymer was precipitated in 400 ml of ether maintained at −10° C. and filtered. The polyelectrolyte was placed in solution in methanol and the potassium ions exchanged for lithium ions by means of a polystyrene-sulfonate ion exchange resin. A 35 μm film was prepared in accordance with Example 1. Following crosslinking of the double bonds (initiated by 1% by weight of azobis(isobutyronitrile)), the electrolyte had a conductivity greater than $10^{-6}$ Scm$^{-1}$ at 25° C.

EXAMPLE 4

The acrylate of 3,3-bis(trifluoromethylsulfonyl)-1-propyl was prepared according to Example 13 of U.S. Pat. No. 3,758,593, by reaction of a mixture of 3,3-bis(trifluoromethylsulfonyl)-1-propane-1-ol in benzene solution with acrylic acid. The corresponding lithium salt was obtained by reaction with an excess of lithium carbonate. 1.3 g of the lithium salt was copolymerized with 4.5 g of the acrylate of methoxyoligoethylene glycol, having a mass of 1000, in aqueous solution by using a redox initiator (FeSo$_4$+ K$_2$S$_2$O$_8$). The viscous solution obtained was spread out and evaporated on a plate of glass covered by 100 nm of indium oxide doped with tin (ITO) and 500 nm of tungsten trioxide WO$_3$. After drying the electrolyte film was covered by another plate of glass of identical size, also covered with 100 nm of ITO and 400 nm of mixed oxide Li$_x$CeO$_2$—TiO$_2$. The ensemble gave an electro-chromic system whose color passed into the dark blue area by application of a voltage of 1.5 V between the ITO electrodes.

EXAMPLE 5

0.2 mole of ethylene oxide was added to 0.1 mole of bis(nonafluorobutylsulfonyl) methane in solution in 50 ml of THF. After evaporation of the solvent, the hydroxyethoxy-3,3-bis(nonafluorobutylsulfonyl)-1-propane was separated by recovery in 100 ml of water, adjustment of the pH level to 1 by means of concentrated hydrochloric acid, and extraction of the organic phase in ethyl ether. The product was purified by chromatography. The sodium salt of the glycidoxyethoxy-3,3-bis(nonafluorobutylsulfonyl)-1-propane was obtained by reaction of epichlorohydrin with the hydroxylated compound previously prepared in the presence of two equivalents of sodium hydroxide. By exchange on a column of Amberlyst® (Amberlite 200), the sodium was replaced by lithium.

In a mechanically stirred, pressurized, stainless steel reaction vessel (made by the Parr® Company) a Vandenberg catalyst was prepared by addition of 100 μl of water and 0.5 ml of pentanedione to a solution of 1.2 g of triethylaluminum in 50 ml of THF. 5 g of the lithium salt of glycidoxyethoxy-3,3-bis(nonafluorobutylsulfonyl)-1-propane, 2.4 g of allyl glycidyl ether and 22 g of ethylene oxide were introduced into the reaction vessel, and heated to 120° C. for 30 hours under a pressure of 700 kPa. After cooling and opening, the polymerization was stopped by the addition of 10 ml of methanol. The ionic copolymer obtained was separated by precipitation in ether and then purified by three sequences of dissolving in ethanol and precipitation in ether.

The copolymer could be crosslinked by the intermediary of the double bonds of the allyl glycidyl ether segments, which become active in the presence of a radical type initiator such as benzoyl peroxide or azobis(isobutyronitrile) by heating at 80° C. A membrane obtained by crosslinking of the copolymer can be used as an electrolyte in an electrochemical generator.

The copolymer can additionally be used as the binder of a composite electrode. Such an electrode can be made from a compound which includes an active electrode material, a compound which ensures electronic conduction, a solvent and the copolymer as binder. The compound is spread on a substrate, the solvent evaporated, and the copolymer is crosslinked. The membrane obtained comprises a composite electrode and has good mechanical performance.

EXAMPLE 6

The potassium salt of glycidoxyethoxy-3,3-bis (trifluoromethylsulfonyl)-1-propane was obtained from (CF$_3$SO$_2$)$_2$CH$_2$ in the same manner as the salt of Example 5.

Into a mechanically stirred Parr® reaction vessel, were added 150 ml of anhydrous THF and 280 mg of potassium t-butoxide. 8 g of the potassium salt of glycidoxyethoxy-3,3-bis(trifluoromethanesulfonyl)-1-propane, 2 g of allyl glycidyl ether, 5 g of propylene oxide and 45 g of ethylene oxide were added to the reaction vessel and heated to 65° C. for 2 hours in order to allow anionic copolymerization of the monomers. The ionic copolymer obtained was separated by precipitation in ether and then purified by three sequences of dissolving in ethanol and precipitation in ether.

The copolymer can be crosslinked in the same manner as in Example 5, by the intermediary of double bonds of the allylglycidyl ether segments, by heating at 60° C. in the presence of 2% by weight of a radical initiator. The crosslinked copolymer obtained in the form of a membrane can be used as an electrolyte in an electrochemical generator. A membrane obtained from a compound containing said copolymer, a solvent, a material which ensures electronic conduction and an electrode active material, can be used to prepare a composite electrode.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letter Patent of the United States is:

1. A macromolecular material having a linear, branched, or comb framework, which is optionally crosslinked, and substituted with ionic substituents, wherein the ionic substituents are incorporated into the macromolecular material by reaction of the macromolecular material with a group Y of one or more ionic monomers having the formula (I):

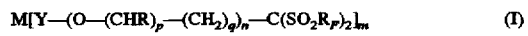

$$M[Y-(O-(CHR)_p-(CH_2)_q)_n-C(SO_2R_F)_2]_m \qquad (I)$$

wherein

M is a proton, a metal alkaline cation, a cation of an alkaline-earth metal, a cation of a transition metal, a cation of a rare earth metal, ammonium, an organic cation chosen from among the cations of amidine, guanidine, pyridine, phosphonium, sulfonium, or ammonium which have at least one substituent; or oxonium;

m represents a valence of cation M;

R$_F$ is linear or branched C$_1$–C$_8$ perfluoroalkyl;

R is hydrogen or C$_1$–C$_4$ alkyl;

Y is allyl, glycidyl, vinylbenzyl, acryloyl, or methacryloyl;

$0 \leq n \leq 40$; and $1 \leq p=q \leq 4$;

with the proviso that if n=0, Y is allyl, glycidyl or vinylbenzyl, wherein the macromolecular material is selected from the group consisting of polyenes, polyesters, polyamides, polynitriles, polyvinylethers and polyoxyalkylenes.

2. The macromolecular material according to claim 1, wherein M is lithium.

3. The macromolecular material according to claim 1, wherein $R_F$ is selected from the group consisting of perfluoromethyl, perfluoroethyl, perfluoropropyl, isoperfluoropropyl, and perfluorobutyl.

4. The macromolecular material according to claim 1, wherein the macromolecular framework includes at least one segment consisting essentially of solvating units, a portion of said solvating units having an ionic substituent —[Y'—(O—(CHR)$_p$-(CH$_2$)$_q$)$_n$—C(SO$_2$R$_F$)$_2$]$^-$ bonded to the macromolecular framework by the Y' radical derived from the Y radical.

5. The macromolecular material according to claim 4, wherein the solvating units are oxyalkylene units.

6. The macromolecular material according to claim 5, wherein the oxyalkylene units also are substituted by one or more substituents selected from the group consisting of $C_1$-$C_{10}$ alkyl substituents, $C_1$-$C_{10}$ oxyalkylene substituents and $C_1$-$C_{10}$ polyoxyalkylene substituents.

7. The macromolecular material according to claim 4, further having one or more solvating segments which are connected to one another and, optionally, to other segments by formation of —C—C— or —C—O— bonds.

8. The macromolecular material according to claim 1, wherein the molecular framework contains at least one segment comprised of nonsolvating units, wherein a portion of said non-solvating units are substituted by an ionic substituent —[Y'—(O—(CHR)$_p$—(CH$_2$)$_q$)$_n$—C(SO$_2$R)$_2$].

9. The macromolecular material according to claim 8, wherein the nonsolvating segment is selected from the group consisting of polyenes, polyesters, polyamides, polynitriles and polyvinylethers.

10. The macromolecular material according to claim 1, wherein the macromolecular framework contains two or more segments which are the same or different, and which are connected to one another by a divalent bonding group, a trivalent bonding group or a tetravalent bonding group.

11. An ionically conductive material comprising at least one macromolecular material according to claim 1.

12. The ionically conductive material according to claim 11, which further comprises an aprotic polar compound.

13. The ionically conductive material according to claim 12, wherein the aprotic polar compound is present in an amount of from 2 to 98% by volume.

14. The ionically conductive material according to claim 13, wherein the aprotic polar compound is present in an amount of from 5 to 98% by volume.

15. The ionically conductive material according to claim 12, wherein the aprotic polar compound is selected from the group consisting of linear and cyclic carbonates, linear and cyclic ethers, polyethers, linear and cyclic esters, linear and cyclic sulfones, sulfamides and nitriles.

16. The ionically conductive material according to claim 11, which further comprises at least one salt of a cation M' and an anion selected from the group consisting of ClO$_4$—, AsF$_6$—, PF$_6$—, BF$_4$—, R$_F$SO$_3$—, CH$_3$SO$_3$—, N(R$_F$SO$_2$)$_2$—, C(R$_F$SO$_2$)$_3$—, and CF(R$_F$SO$_2$)$_2$—, wherein R$_F$ represents a $C_1$-$C_8$ perfluoroalkyl group or fluorine, and wherein the cation M' is selected from the group consisting of a proton, alkaline metal cations, alkaline earth metal cations, transition metal cations, ammonium cations, rare earth metal cations, organic cations selected from the group consisting of cations of amidine, guanidine, pyridine, phosphonium, sulfonium, and ammonium each having at least one substituent, and oxonium.

\* \* \* \* \*

UNITED STATES PATENT AND TRADEMARK OFFICE
CERTIFICATE OF CORRECTION

PATENT NO. : 5,696,224
DATED : December 9, 1997
INVENTOR(S) : Djamila BENRABAH, et al.

It is certified that error appears in the above-identified patent and that said Letters Patent is hereby corrected as shown below:

On the title page, item [54], and column 1, line 2, Macromelecular should be

--MACROMOLECULAR--

Signed and Sealed this

Twenty-fourth Day of February, 1998

Attest:

BRUCE LEHMAN

Attesting Officer

Commissioner of Patents and Trademarks